(12) United States Patent
Chemali

(10) Patent No.: US 10,107,094 B2
(45) Date of Patent: Oct. 23, 2018

(54) FORMATION DENSITY OR ACOUSTIC IMPEDANCE LOGGING TOOL

(71) Applicant: HALLIBURTON ENERGY SERVICES, INC., Houston, TX (US)

(72) Inventor: Roland E. Chemali, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 15/321,541

(22) PCT Filed: Jul. 18, 2014

(86) PCT No.: PCT/US2014/047239
§ 371 (c)(1),
(2) Date: Dec. 22, 2016

(87) PCT Pub. No.: WO2016/010559
PCT Pub. Date: Jan. 21, 2016

(65) Prior Publication Data
US 2017/0211381 A1 Jul. 27, 2017

(51) Int. Cl.
*G01V 1/50* (2006.01)
*E21B 49/00* (2006.01)

(52) U.S. Cl.
CPC ............... *E21B 49/00* (2013.01); *G01V 1/50* (2013.01); *G01V 2210/6224* (2013.01); *G01V 2210/6226* (2013.01)

(58) Field of Classification Search
CPC ............. G01V 1/50; G01V 2210/6224; G01V 2210/6226; E21B 49/00
USPC ............................................. 367/35
See application file for complete search history.

(56) References Cited

U.S. PATENT DOCUMENTS

| 3,175,638 A | 3/1965 | Hubbard et al. |
| 3,883,841 A | 5/1975 | Norel et al. |
| 4,255,798 A | 3/1981 | Havira |
| 4,698,792 A * | 10/1987 | Kurkjian ............. G01V 1/44 101/104 |
| 4,918,669 A | 4/1990 | Chemali et al. |
| RE36,012 E | 12/1998 | Loomis et al. |
| 5,984,023 A | 11/1999 | Sharma et al. |

(Continued)

FOREIGN PATENT DOCUMENTS

| WO | 2007/001801 | 1/2007 |
| WO | 2010/141014 | 6/2010 |
| WO | 2014/099122 | 6/2014 |

OTHER PUBLICATIONS

"Resonance," Wikipedia Jun. 12, 2013, downloaded Feb. 20, 2018 from https://en.wikipedia.org/w/index.php?title=Resonance&oldid=559571903, 9 pages. (Year: 2013).*

(Continued)

*Primary Examiner* — Daniel L Murphy
(74) *Attorney, Agent, or Firm* — Benjamin Fite; Parker Justiss, P.C.

(57) ABSTRACT

An illustrative method that includes positioning an acoustic transducer downhole substantially parallel to a borehole wall, thereby creating a fluid layer between the wall and the acoustic transducer, and measuring an acoustic impedance at the surface of the acoustic transducer at a resonance frequency of the fluid layer, thereby determining an acoustic impedance of the formation.

22 Claims, 4 Drawing Sheets

(56) References Cited

U.S. PATENT DOCUMENTS

| | | | |
|---|---|---|---|
| 5,987,385 | A | 11/1999 | Varsamis et al. |
| 6,050,141 | A | 4/2000 | Tello et al. |
| 6,611,761 | B2 | 8/2003 | Sinha et al. |
| 6,678,616 | B1 | 1/2004 | Winkler et al. |
| 6,868,036 | B2 | 3/2005 | Wang et al. |
| 6,957,572 | B1 * | 10/2005 | Wu .................. G01V 1/50 73/152.16 |
| 7,099,810 | B2 | 8/2006 | Mandal |
| 7,626,886 | B2 * | 12/2009 | Dubinsky ............. G01V 1/50 181/104 |
| 7,966,882 | B2 | 6/2011 | Greenwood |
| 8,125,848 | B2 | 2/2012 | Geerits et al. |
| 8,387,473 | B2 | 3/2013 | Breeding |
| 2003/0042018 | A1 | 3/2003 | Huh et al. |
| 2007/0005251 | A1 | 1/2007 | Chemali et al. |
| 2010/0095757 | A1 | 4/2010 | Hansen |
| 2013/0125641 | A1 | 5/2013 | Chemali et al. |
| 2014/0169127 | A1 | 6/2014 | Orban |

OTHER PUBLICATIONS

Halliburton Energy Services, Inc., "Open Hole Logging in Your Environment," [retrieved from: http://www.halliburton.com/public/lp/contents/Brochures/web/h07244%20open%20hole%20logging.pdf], 2009, 4 pgs.

PCT International Search Report and Written Opinion, dated Apr. 14, 2015, Appl No. PCT/US2014/047239, "Formation Density or Acoustic Impedance Logging Tool," Filed Jul. 18, 2014, 17 pgs.

Havira, R. M. et al., "Ultrasonic Cement Bond Evaluation," SPWLA Twenty-Third Annual Logging Symposium, Jul. 6-9, 1982, Schlumberger-Doll Research, Ridgefield, Connecticut. 11 pgs.

Willis, Mark E. et al., "Automatic P and S Velocity Determination from Full Waveform Digital Acoustic Logs," Geophysics, vol. 48, No. 12, Dec. 1983, p. 1631-1644.

* cited by examiner

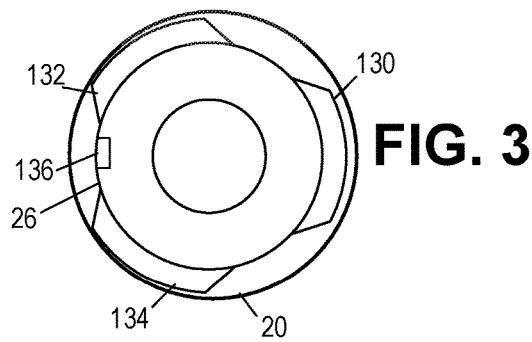
FIG. 3
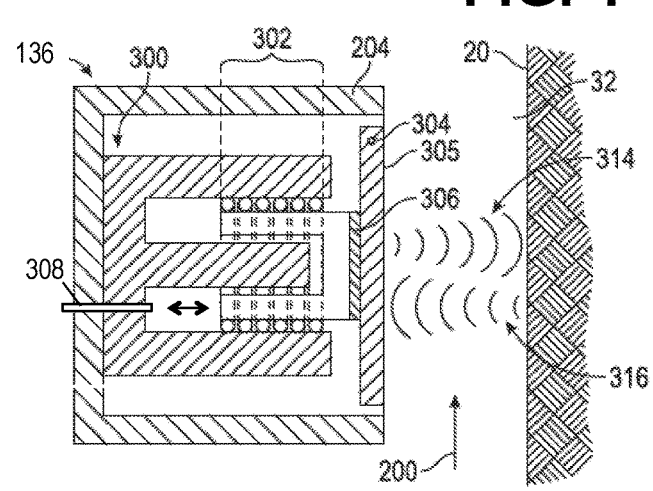
FIG. 4
FIG. 5
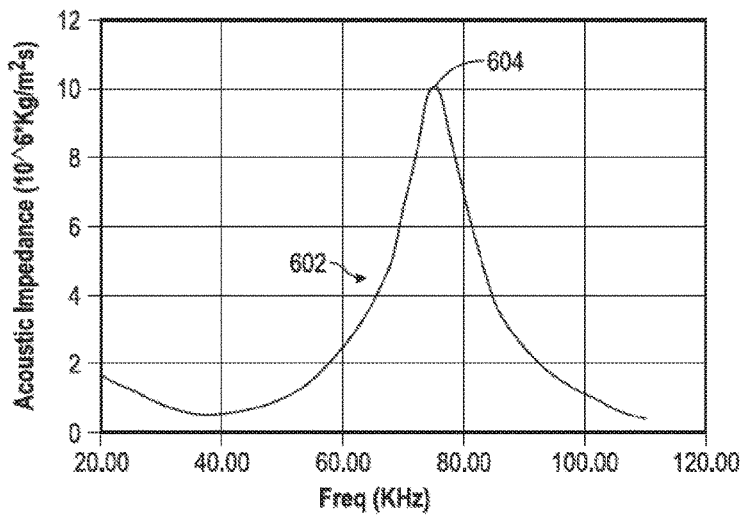

FORMATION DENSITY OR ACOUSTIC IMPEDANCE LOGGING TOOL

BACKGROUND

In the quest for hydrocarbon reservoirs, companies employ many data-gathering techniques, such as well logging. During the well drilling process, or shortly thereafter, drillers pass logging instruments through the borehole to collect information about the surrounding formations. The information is traditionally collected in "log" form, i.e., a table, chart or graph of measured data values as a function of position along the borehole. When the position information for the logging instrument includes both depth and orientation, the log can take the form of a two-dimensional "image" of the borehole wall. Imaging enables analysts to study the fine-scale structure of the penetrated formations, including stratifications, fractures, dip angles, rock texture, vugs, and other features and anomalies. Image logging may be accomplished, for example, by wireline logging or logging-while-drilling (LWD).

In wireline logging, a sonde is lowered into the borehole after some or the entire well has been drilled. The sonde hangs at the end of a long cable (a "wireline") that provides mechanical support and an electrical connection between the sonde and logging equipment located at the surface of the well. In accordance with existing logging techniques, various parameters of the earth's formations are measured and correlated with the position of the sonde in the borehole as the sonde is pulled uphole. In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

The various types of logging information sought include among others formation density, formation resistivity, acoustic velocity, pore volume, and pore pressure. Formation density is most commonly measured by measuring the attenuation and/or scattering of nuclear radiation from a radioactive source (see, e.g., *Well Logging for Earth Scientists*, 2d by Darwin Ellis and Julian Singer, © 2007 Springer, ISBN 978-1-4020-3738-2). Accordingly, the acquisition of such logs may require the transport, deployment, and use of radioactive material, with the corresponding allocation of resources for safety and security. Another formation density measurement technique employs a nuclear magnetic resonance (NMR) tool to indirectly estimate formation porosity, which in turn correlates to formation density provided the density of the grain of the matrix is known.

Another measurement of interest in the oil and gas well construction domain is the acoustic impedance at the outer surface of the casing. For well control and zonal isolation requirements there are instances where the outer surface of the casing must be well bonded to a sheath of cement. The interface between the casing and the cement exhibits in that case significantly higher acoustic impedance than if the outer surface of the casing were simply in contact with gas or liquid. The acoustic impedance measurement is then directly interpreted as a cement bond quality log (see, e.g., U.S. Pat. No. 4,255,798, issued Mar. 10, 1981, and R. M. Havira, "Ultrasonic Cement Bond Evaluation", Paper N, SPWLA Symposium 1982)

BRIEF DESCRIPTION OF THE DRAWINGS

Accordingly, there are disclosed herein logging systems, tools, and methods for measuring the acoustic impedance and density of the formation. In the drawings:

FIG. 3 is a cross-sectional view of an illustrative LWD imaging tool.

FIG. 4 is an enlarged cross-sectional view of an illustrative acoustic transducer for measuring resonant acoustic impedances.

FIG. 5 is an illustrative graph of acoustic impedance versus frequency.

Figure 1:
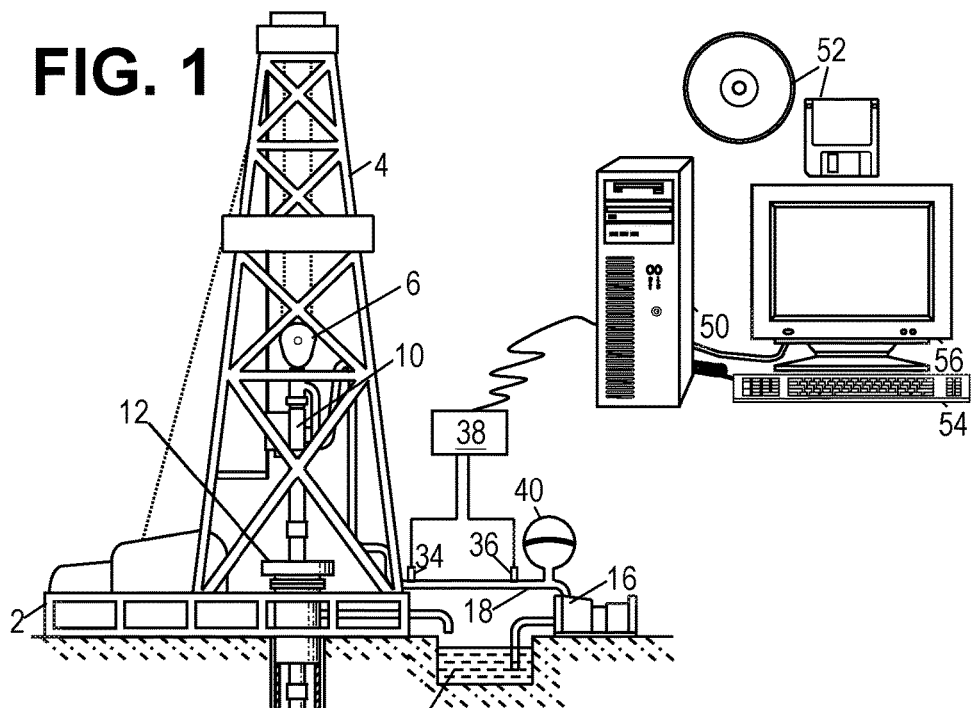
FIG. 1 is an illustrative logging-while-drilling (LWD) environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are systems and methods for measuring acoustic impedance and density of a formation. Certain illustrative method embodiments include positioning an acoustic transducer downhole substantially parallel to a borehole wall, thereby creating a fluid layer between the wall and the acoustic transducer, and measuring an acoustic impedance at the surface of the acoustic transducer at a resonance frequency of the fluid layer, thereby determining the acoustic impedance of the formation. The acoustic transducer may include a speaker coil, a plate arranged on the exterior of that transducer, and a stress sensor arranged therebetween. The transducer may also include a displacement sensor to measure the amplitude of the displacement of the face of the transducer. The combined knowledge of the stress at the face of the transducer and the amplitude of displacement at the face of the transducer yields a direct estimate of the acoustic impedance at the face of the transducer. The position and orientation of the transducer may be tracked to map the acoustic impedance estimates into a borehole wall image.

The disclosed tools and methods may further include (or may be combined with separate tools having) sensors for measuring acoustic wave velocities in the formation as a function of position and orientation. The acoustic impedance estimates may be divided by the acoustic wave velocity measurements to obtain the formation density. (Division by acoustic wave velocity may be regarded as equivalent to multiplication by acoustic wave slowness.)

The disclosed tool and method embodiments can be best understood in a usage context. Accordingly, FIG. 1 shows an illustrative logging while drilling (LWD) environment. A drilling platform 2 is equipped with a derrick 4 that supports a hoist 6. Rig operators drill oil and gas wells using a string of drill pipes coupled together and to form a drill string 8. The hoist 6 suspends a top drive 10 that operates to rotate the drill string 8 and to lower the drill 8 string through the wellhead 12 and into the formation 30. Connected to the lower end of the drill string 8 is a drill bit 14. Drilling is accomplished by rotating the bit 14 and drill string 8, by use of a downhole motor near the drill bit, or by both methods. Mud recirculation equipment 16 pumps drilling fluid through supply pipe 18, through top drive 10, and down through the drill string 8 at high pressures and volumes to emerge through nozzles or jets in the drill bit 14. The mud then travels back up the hole via an annulus 32 formed between the exterior of the drill string 8 and the borehole wall 20, through a blowout preventer, and into a mud pit 22 on the surface. On the surface, the drilling mud is cleaned and then recirculated by recirculation equipment 16. The drilling mud cools the drill bit 14, carries cuttings from the base of the bore to the surface, and balances the hydrostatic pressure in the rock formations.

The bottom hole assembly (i.e., the lowermost part of drill string 8) includes thick-walled tubulars (called drill collars) to add weight and rigidity to aid the drilling process. The thick walls of these drill collars make them useful for housing instrumentation and LWD sensors. Thus, for example, the bottom hole assembly of FIG. 1 may include a micro-sonic imaging tool 24 having one or more acoustic transducers for measuring acoustic wave velocities in the formation, a separate resonant impedance sensor 26 for estimating acoustic impedance of the formation, a position and orientation measurement tool 28, and a control and telemetry module 30. Other tools and sensors can also be included in the bottom hole assembly to gather measurements of various drilling parameters such as weight-on-bit, borehole diameter, etc. The tool orientation may be specified in terms of a tool face angle (rotational orientation), an inclination angle (the slope), and compass direction, each of which can be derived from measurements by magnetometers, inclinometers, accelerometers, gyroscopes, and the like.

As the bit extends the borehole through the formations, the micro-sonic imaging tool 24 rotates and collects acoustic wave velocity measurements that a downhole controller associates with tool position and orientation to form a velocity image map of the borehole wall. Similarly, the resonant impedance sensor 26 rotates and collects acoustic impedance measurements that a downhole controller associates with tool position and orientation to form an acoustic impedance image map of the borehole wall. (The operating principles of these tools are discussed in greater detail below.) Control and telemetry module 30 collects measurement data and signals from the tools 24, 26, 28, and the other bottom hole assembly instruments and stores them in internal memory. Selected portions of the data can be communicated to the surface by, e.g., mud pulse telemetry. Other logging-while drilling telemetry methods also exist and could be employed. As one particular example, the drillstring 8 could be formed from wired drillpipe that enables waveforms or images to be transmitted to the surface in real time to enable quality control and processing to optimize the logging resolution.

For mud pulse telemetry, telemetry module 30 modulates a resistance to drilling fluid flow to generate pressure pulses that propagate to the surface. One or more pressure transducers 34, 36 (isolated from the noise of the mud pump 16 by a desurger 40) convert the pressure signal into electrical signal(s) for a signal digitizer 38. The digitizer 38 supplies a digital form of the pressure signals to a computer 50 or some other form of a data processing device. Computer 50 operates in accordance with software (which may be stored on non-transitory information storage media 52) and user input received via an input device 54 to process and decode the received signals. The resulting telemetry data may be further analyzed and processed by computer 50 to generate a display of useful information on a computer monitor 56 or some other form of a display device. For example, an operator could employ this system to obtain and view an acoustic impedance log and, in at least some cases, a formation density log. Either log may be displayed in the form of a borehole wall image, or as an average impedance/density value versus position.

Figure 2:
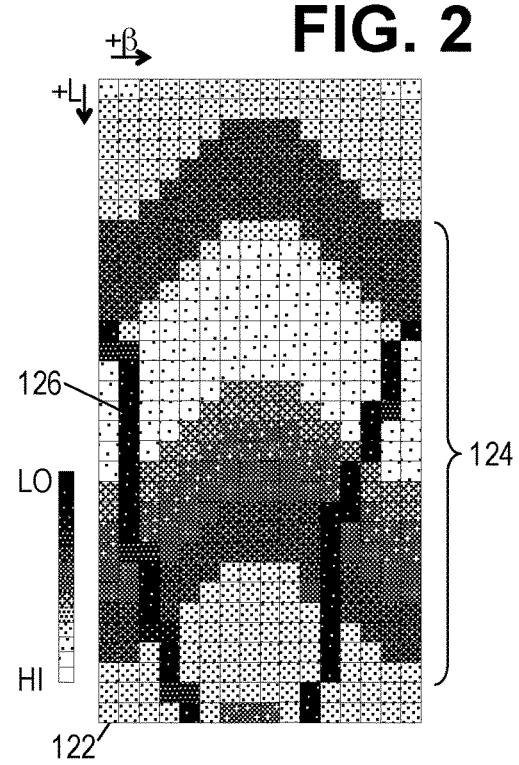
FIG. 2 is an illustrative borehole wall image.

FIG. 2 shows an illustrative borehole wall image 122 that results when formation measurements (such as acoustic wave velocity, acoustic impedance, or density) are associated with tool position L and rotational orientation β. The surface of the borehole wall is divided into "bins", with each bin representing a pair of tool position L and rotational orientation β values. Each time the sensing surface passes a bin, it gathers one or more measurements that can be combined with previous measurements for that bin. The combined measurements can then be processed (as discussed further below) to obtain a density estimate that can be displayed as a pixel color and/or a pixel intensity. Such an image often reveals bedding structures (such as structures 124) and fractures (such as fracture 126). Such features often exhibit a sinusoidal dependence on rotational angle, indicating that the borehole encountered the feature at an angle other than 90 degrees. We note here that such features are usually apparent even if the density measurements are only relative in nature rather than precisely accurate. The image resolution is largely determined by the measurement resolution of the sensing surface, which may depend on the size, spacing, and standoff of the acoustic transducers.

FIG. 3 shows a cross-section of an illustrative LWD embodiment of a resonant impedance sensing tool 26 in a borehole 20. The impedance sensing tool 26 shown includes three stabilizer blades 130, 132, 134 that keep the tool centralized. The precise configuration and number of stabilizer blades can vary based on the expected drilling environment and should in general be expected to increase in number as the borehole diameter increases.

The tool 26 includes an acoustic transducer 136 located between stabilizer blades 132, 134. An enlarged cross-sectional view is shown in FIG. 4. As depicted, the acoustic transducer 136 includes a magnetic cradle 300 arranged within the wall 204 of the sonic logging tool 24. Mounted to the cradle 300 is a "speaker coil" (e.g., electromagnetic solenoid) assembly 302 and a plate 304 having a surface 305 oriented substantially parallel to the borehole wall 20. A piezoelectric stress sensor 306 may be arranged between the speaker coil assembly 302 and the plate 304 to measure the force (and hence the dynamic pressure) exerted on the surface 305. Other stress sensor technologies are also known and may be used. The speaker coil assembly 302 may emit a narrowband acoustic output signal 314 swept over a range of frequencies (e.g., 10 kHz to 120 kHz), or alternatively a broadband signal. The plate 304 is preferably thin (while remaining thick enough to be rigid) and the surface 305 is in direct contact with the fluid 200 within the annulus 32.

In addition to the pressure measurement obtained via the stress sensor 306, the acoustic transducer is provided with a motion sensor (shown in FIG. 4 as an optical fiber 308 that carries a light beam to and from the speaker coil assembly 302) to measure the oscillatory displacement or velocity of the plate 304. This motion sensor may be, for example, a laser interferometer or a high accuracy accelerometer or an auxiliary solenoid. Alternatively, the motion of the plate 304 may be obtained indirectly by measuring the speaker coil's load current or electrical impedance. Whether the measurements are of surface pressure and surface velocity or some other transducer characteristics, they are preferably sufficient to yield a determination of the acoustic impedance offered at the transducer's surface 305 at any given frequency.

The speaker coil assembly 302, the stress sensor 306, and the motion sensor 308, may be coupled to, and controlled by, a tool controller or other form of processor that executes stored firmware or software to estimate the acoustic impedance of the formation. Under the control of the software, the tool controller causes the acoustic transducer 136 to generate acoustic signals with the acoustic transducer 300, acquire measurements representative of its acoustic impedance, and based thereon determine the formation impedance. The tool controller may store the formation impedance as a function of position and orientation, and may further communicate (via a telemetry system) at least some of the measurements to the surface for display.

In exemplary operation, the tool controller drives the coil assembly 302, causing the plate 304 to oscillate and thereby emit an acoustic signal 314 toward the formation. The acoustic signal 314 may be a narrowband signal generated at a controllable or swept frequency, or may alternatively be a broadband signal. The acoustic signal 314 propagates from surface 305, through the layer of fluid 200, and reaches the formation wall 20, reflecting (at least in part) therefrom to form a reflected signal 316. The reflected signal returns through the layer of fluid 200 to reach plate 304, at least partly reflecting therefrom. The acoustic signals 314, 316 vibrate the fluid layer, with the vibration intensity depending on, among other things, the acoustic signal frequency. As shown in FIG. 5, the acoustic impedance 602 of the driving surface 305 similarly depends on the acoustic signal frequency, reaching a peak 604 at the resonance frequency of the fluid layer. (The acoustic impedance of driving surface 305 is expressible as a ratio of pressure on surface 305 to the velocity of surface 305.) The amplitude of this resonance peak 604 corresponds to the formation's acoustic impedance. In theory, the acoustic impedance peak equals the acoustic impedance of the formation, but when accounting for flexure and curvature of surface 305, curvature of formation wall 20, and non-idealities of the driving and sensing circuits, a calibration factor may be necessary to match the peak value to the formation's acoustic impedance. The calibration factor may further enable the use of other transducer characteristics (e.g., displacement, acceleration, force, back EMF) for the measurement of acoustic impedance.

To achieve greater signal strength without incurring penalties associated with added mass and flexure of plate 304, the impedance sensing tool may include multiple such transducers 136 arranged adjacently along a line or across an area. In addition to increasing the driving surface area, the various acoustic transducers may be driven in a phased manner to focus the signal or at least partially compensate for the "fringe" or "edge" effect that may result from signal diffraction and dispersion. Additionally, such an array configuration may improve spatial resolution the measurements, which is beneficial for producing borehole wall images.

Figure 6:
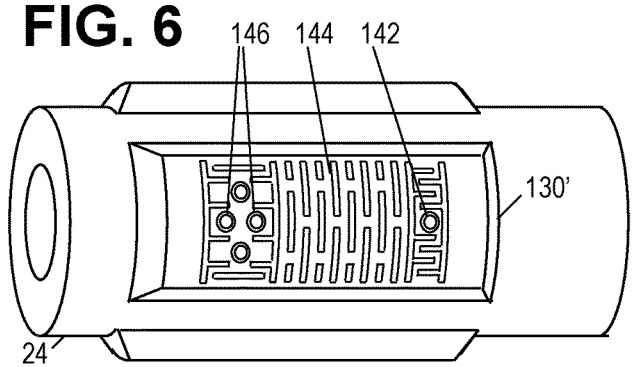
FIG. 6 is a side view of the illustrative LWD imaging tool for measuring acoustic wave velocity of the formation.

FIG. 6 shows a side-view of an illustrative micro-sonic imaging tool 24 to measure acoustic wave velocity in the formation. Tool 24 may be separate from, or integrated with, resonant impedance sensing tool 26. Referring back to FIG. 3, if the two tools are integrated, the acoustic velocity measurement configuration shown in FIG. 6 may be provided on stabilizer blade 130, opposite the acoustic transducer 136. The two acoustic tools 24, 26, can be operated in a manner that avoids interference, e.g., by firing each transducer only when the other is quiet, or operating the two transducers in non-overlapping frequency ranges.

Figure 7:
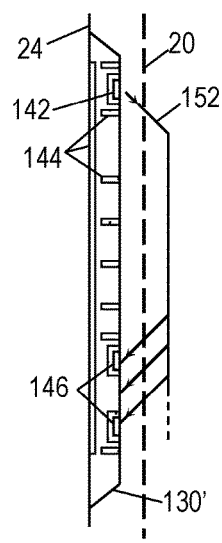
FIG. 7 shows the tool of FIG. 6 measuring the propagation velocity of an acoustic wave in the borehole wall.

FIG. 6 shows a side view, while FIG. 7 shows a cross-section detail. In these views it can be seen that the distal face of the stabilizer blade 130' has an inset transmitter 142 separated from an array of inset receivers 146 by an acoustic isolation zone 144. The acoustic isolation zone 144 is designed to attenuate and delay acoustic wave energy propagating through the tool body from the transmitter 142 to the receivers 146. To that end, the acoustic isolation zone can include voids or inserts that provide an arrangement of acoustic contrasts to reflect and attenuate acoustic wave energy. The inserts can be made of a resilient material (e.g., vulcanized rubber) that efficiently dissipates acoustic wave energy as heat, thereby providing further attenuation. Careful design of the void shapes can create a series of acoustic propagation paths that cause destructive interference at the receivers over a desired frequency band. By reducing and delaying the acoustic wave energy that reaches the receivers through the tool body, the acoustic isolation zone 144 improves the sensitivity of the receivers to the acoustic wave energy 152 propagating along the borehole wall 20.

The acoustic transmitters are electrical transducers made of a piezoelectric or magnetostrictive material, enabling the tool 24 to generate programmable acoustic signals. Alternatively, bender bars or other acoustic transducers can be used. The receivers can be electrical transducers made of a piezoelectric material. In some embodiments, the transmitter and receiver transducers are flush with the surface of a wall-contacting face 130' to minimize standoff, while in other embodiments the transducers are slightly inset, covered with a protective layer, and/or set in a protrusion face that is kept at a small standoff from the borehole wall 20 to prevent undue erosion of the transducers. In some embodiments, the transducers are inset by approximately ⅛ inch, or possibly up to about ¼ inch, and the total inset area surrounding the transducer is no more than 10 times the sensing area of the transducer itself. In other embodiments, the distal face of the protrusion is kept at a small standoff (e.g., about ¹/₁₀ of an inch) as the tool rotates within the borehole. This configuration could be achieved using a set of stabilizers on either side of the tool, with a slightly larger outer diameter than the circle traced by the distal face of the tool protrusion(s). Some designs angle the transmitter and receiver transducers towards each other to increase the signal strength.

At least two receivers 146 are preferably employed, enabling the tool to make slowness measurements having a resolution on the order of the spacing between the receivers. One or more laterally spaced receivers can be added to enable direction-of-arrival determination. Such measurements enable the tool to correct for the effects of tool rotation.

The contemplated operating frequencies for the sonic logging tool are in the range between 50 kHz and 150 kHz, inclusive. The operating frequency may be selected on the basis of a tradeoff between attenuation and wavelength in which the wavelength is minimized subject to requirements for limited attenuation. Subject to the attenuation limits on performance, smaller wavelengths may offer improved spatial resolution of the tool. When the micro-sonic logging tool 24 is enabled, the internal controller controls the triggering and timing of the acoustic source 142, and records and processes the signals from the receivers 146. The internal controller fires the acoustic source 142 periodically, producing acoustic pressure waves that propagate into the formation and along the borehole wall 20. As these pressure waves propagate past the array of receivers 146, they cause pressure variations that can be detected by the receiver transducers.

The internal controller can process the signals to determine arrival time delays between various receivers for P-waves and S-waves in accordance with, for example, the principles and techniques provided in Willis and Toksoz, "Automatic P and S velocity determination from full waveform digital acoustic logs", Geophysics, v48 n12, December 1983, p 1631-44. Differences in arrival times represent the propagation delay, which is combined with the distance information to obtain slowness and/or velocity. Because they can be readily derived from each other, the terms "slowness" and "velocity" are sometimes used interchangeably.

We note that in at least some cases the detected waveforms will represent a variety of wave types, including waves propagating through the body of the tool (tool waves), compression waves from the formation (P-waves), shear waves from the formation (S-waves), waves propagating through the borehole fluid (mud waves), and Stoneley waves propagating along the borehole wall. If desired, the controller can process the signals using semblance processing techniques such as those disclosed by B. Mandal in U.S. Pat. No. 7,099,810 to separate the different wave types and determine their individual slownesses.

The receiver array signals may be processed by a downhole controller to determine $V_C$ (the formation's compression wave velocity) and the velocities of other acoustic wave modes, and to associate such measurements with borehole position and tool orientation to generate one or more images of the acoustical properties of the borehole wall. The log or image is then stored.

Figure 8:
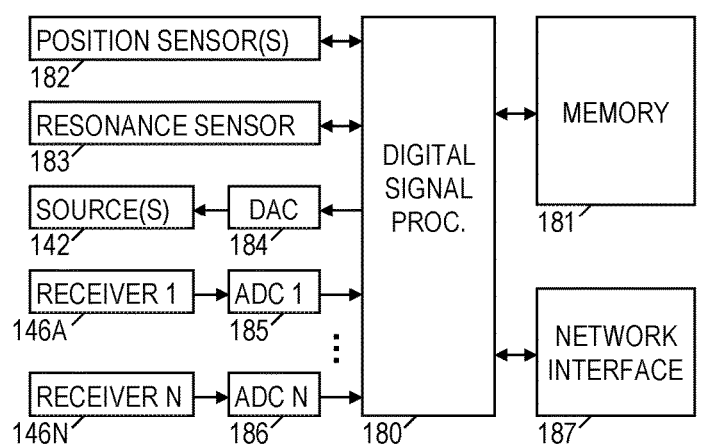
FIG. 8 is a functional block diagram of illustrative tool electronics.

FIG. 8 is a functional block diagram of an integrated micro-sonic and resonant impedance logging tool. A digital signal processor 180 operates as an internal controller for the tool by executing software stored in memory 181. The software configures the processor 180 to collect measurements from various measurement modules such as position sensor 182 and resonant impedance sensor 183. (Note that these modules can alternatively be implemented as separate tools in the bottomhole assembly, in which case such measurements would be gathered by a control/telemetry module 30.)

The software further configures the processor 180 to actuate the resonant acoustic impedance sensor 183 and acquire measurements such as surface pressure and velocity, from which an estimate of the formation's acoustic impedance may be determined. The software further configures the processor 180 to fire the source(s) 142 via a digital to analog converter 184, and further configures the processor 180 to obtain receive waveforms from the array of receivers 146A-146N via analog to digital converters 184-186. The digitized waveforms can be stored in memory 181 and/or processed to determine at least the formation compression wave velocities. As explained further below, the processor can combine the compression wave velocity with the formation acoustic impedance to determine an estimate of formation density. Alternatively, these measurements can be determined separately and communicated to a control module or a surface processing facility to be combined there. In either case, the formation density estimates are associated with the position and orientation of the logging tool to provide a density log. A network interface 187 connects the sonic logging tool to a control/telemetry module via a tool bus, thereby enabling the processor 180 to communicate information to the surface (e.g., velocity measurements, impedance measurements, and/or density logs) and to receive commands from the surface (e.g., activating the tool or changing its operating parameters).

Figure 9:
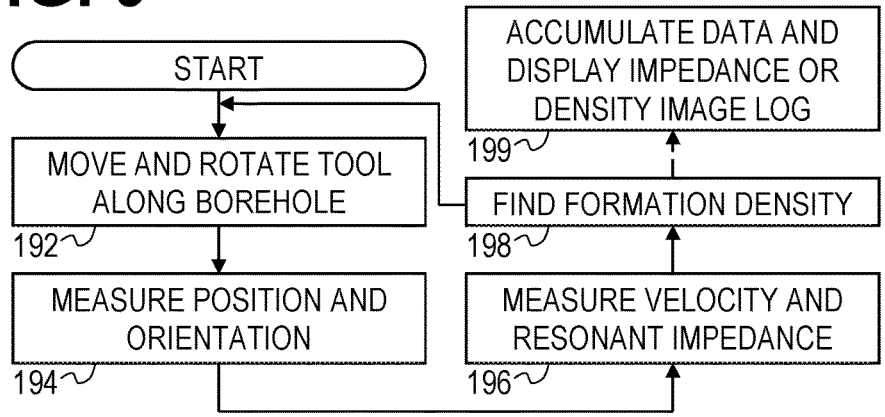
FIG. 9 is a flowchart of an illustrative sonic density imaging method.

FIG. 9 is a flow diagram of an illustrative acoustic impedance/density imaging method. The method may be implemented by software stored in a memory and carried out by a processor and acoustic transducers, such as the memory 181, processor 180, and acoustic transducer 183 of FIG. 8. At block 192, the resonant acoustic impedance logging tool 26 is moved along the borehole and rotated, e.g., as part of a drillstring or as part of a wireline tool with a scanning assembly. The acoustic transducer's surface 305 is preferably maintained substantially parallel to a borehole wall, thereby creating a fluid layer between the borehole wall and the acoustic transducer.

In block 194, the logging tool acquires a measurement of tool position and orientation (or possibly a time value that can be later mapped to measurements of tool position and orientation taken by a separate navigation module). In block 196, the tool actuates the acoustic transducer that vibrates the fluid layer to determine an acoustic impedance measurement at the resonant frequency of the fluid layer. The acoustic impedance at the resonant frequency peak may be found in any suitable fashion, including frequency sweeping a narrowband signal, curve-fitting measurements sampled at multiple frequencies, performing frequency analysis (e.g., Fourier transform) on a broadband signal response, running a gradient-based "peak-finding" search, and adaptive-control-based tracking. Once obtained, the resonant impedance measurement may be mapped (via a calibration factor) to obtain an estimate of the formation's acoustic impedance.

In block 196, the tool may further actuate the micro-sonic logging tool to acquire a acoustic wave velocity measurement of the formation. Both the acoustic impedance and acoustic velocity measurements are associated with the tool position and orientation measurements from block 194. The tool position and orientations may be "binned" to form pixels for the borehole wall image (see, e.g., FIG. 2). The processor may combine the measurements for each bin via averaging or some other statistical technique that exploits the availability of multiple measurements to improve signal-to-noise ratio.

In block 198, the tool may combine the measured acoustic impedance and acoustic velocity measurements of the formation to estimate formation density. Blocks 192-198 are repeated to generate measurements of formation acoustic impedance, formation acoustic wave velocity, and/or formation density, as a function of tool position and orientation. Some or all of these measurements are accumulated downhole and optionally communicated to the surface to build the image logs of these attributes. Those measurements communicated to the surface may be displayed on a user interface (e.g., display 56 of FIG. 1) in block 199.

The functions described in FIG. 9 can be distributed throughout the logging system or concentrated within the internal processor of the logging tool. Thus, for example, the position measurements, fluid measurements, and formation wave velocity measurements can be made by separate tools and communicated to a separate processing facility where the density calculation is performed. Moreover, the functions can be carried out in a parallel or asynchronous fashion even though they are described for explanatory purposes as occurring in a sequential order.

Figure 10:
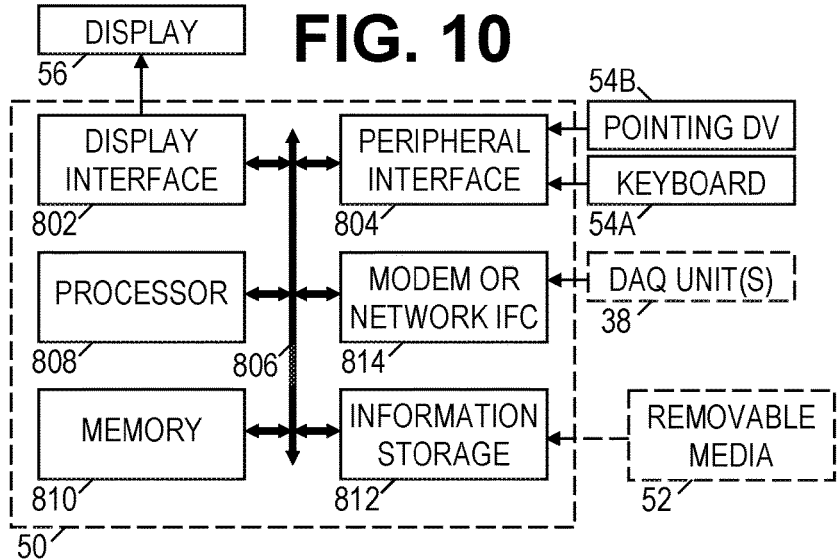
FIG. 10 is a block diagram of an illustrative computer system.

FIG. 10 is a block diagram of an illustrative surface processing system suitable for collecting, processing, and displaying logging data. In some embodiments, a user may further interact with the system to send command to the bottom hole assembly to adjust its operation in response to the received data. The system of FIG. 10 can take the form of a computer that includes a chassis 50, a display 56, and one or more input devices 54A or 54B. Located in the chassis 50 is a display interface 802, a peripheral interface 804, a bus 806, a processor 808, a memory 810, an information storage device 812, and a network interface 814. Bus 806 interconnects the various elements of the computer and transports their communications.

In at least some embodiments, the surface telemetry transducers are coupled to the processing system via a data acquisition unit 38 and the network interface 814 to enable the system to communicate with the bottom hole assembly. In accordance with user input received via peripheral interface 804 and program instructions from memory 810 and/or information storage device 812, the processor processes the received telemetry information received via network interface 814 to construct formation property logs (including one or more borehole wall images) and to display them to the user.

The processor 808, and hence the system as a whole, generally operates in accordance with one or more programs stored on an information storage medium (e.g., in information storage device 812 or removable information storage media 52). Similarly, the bottom hole assembly control module and/or internal controller for the sonic logging tool 26 operates in accordance with one or more programs stored in an internal memory. One or more of these programs configures the tool controller, the bottomhole assembly control module, and the surface processing system to individually or collectively carry out at least one of the density logging methods disclosed herein Numerous other modifications, equivalents, and alternatives, will become apparent to those skilled in the art once the above disclosure is fully appreciated. It is intended that the following claims be interpreted to embrace all such modifications, equivalents, and alternatives where applicable.

Embodiments disclosed herein include:

A: A method including positioning an acoustic transducer downhole substantially parallel to a borehole wall, thereby creating a fluid layer between the wall and the acoustic transducer, and measuring an acoustic impedance at the surface of the acoustic transducer at a resonance frequency of the fluid layer, thereby determining an acoustic impedance of the formation.

B: A system having a sonic logging tool that passes along a borehole through a formation, wherein the sonic logging tool includes an acoustic transducer positioned substantially parallel to a wall of the borehole, thereby creating a fluid layer between the wall and the acoustic transducer, and wherein the sonic logging tool measures the acoustic impedance of the acoustic transducer at a resonance frequency of the fluid layer, and a processor coupled to the sonic logging tool which receives the acoustic impedance measurements, and determines an acoustic impedance of the formation based thereon.

Each of embodiments A and B may have one or more of the following additional elements in any combination:

Element 1: Dividing the acoustic impedance by an acoustic wave velocity of the formation to obtain a formation density measurement. Element 2: Repeating said positioning, measuring, and dividing to obtain the formation density measurement as a function of position along the borehole, and displaying the formation density measurement as a function of position along the borehole. Element 3: Repeating said positioning, measuring, and dividing to obtain the formation density measurement as a function of position around the borehole, and displaying the formation density measurement as a two-dimensional image, the image being a function of position along and around the borehole. Element 4: Sensing an acoustic transducer surface pressure and transducer surface velocity, and calculating acoustic impedance of the acoustic transducer as a ratio of the acoustic transducer surface pressure to the acoustic transducer surface velocity. Element 5: Determining the resonance frequency by identifying a maximum of the acoustic impedance magnitude as a function of frequency. Element 6: Determining the resonance frequency of the fluid layer by identifying a frequency at which the acoustic transducer surface pressure and acoustic transducer surface velocity are in phase and/or a frequency with maximum amplitude for the impedance. Element 7: Performing a frequency sweep to determine the resonance frequency of the fluid layer. Element 8: Determining the resonance frequency of the fluid layer by performing a spectral analysis of a response of the acoustic transducer to a broadband signal. Element 9: Measuring the acoustic wave velocity of the formation with spaced-apart acoustic transducers.

Element 10: a display device which presents the density as a function of position along the borehole to a user. Element 11: a display device which presents a two-dimensional image of the density to a user, the two-dimensional image being a function of position along and around the borehole. Element 12: a nontransient information storage medium where the processor stores said density as a function of position along the borehole. Element 13: where the acoustic transducer is a piezoelectric transducer. Element 14: where the acoustic transducer includes a speaker coil, a plate arranged on the exterior of the transducer, and a stress sensor arranged between the speaker coil and the plate. Element 15: where the acoustic transducer is part of a drill collar. Element 16: where the resonant frequency ranges from 10 kHz to 250 kHz. Element 17: where the sonic logging tool generates a broadband signal and the processor determines the resonant frequency of the fluid layer by performing a spectral analysis of a response of the acoustic transducer to the broadband signal. Element 18: where the emitting and receiving of acoustic signals are performed in a wireline environment. Element 19: further comprising a phased array of the acoustic transducers that operate to reduce fringe effects.

What is claimed is:

1. A method, comprising:
positioning a surface of an acoustic transducer downhole substantially parallel to a wall of a borehole, thereby creating a fluid layer between the wall and the surface of the acoustic transducer;
measuring a resonance frequency and an intensity of acoustic signals at the surface of the acoustic transducer caused by the acoustic signals propagating through the fluid layer between the wall and the surface of the acoustic transducer; and
determining an acoustic impedance of a formation from the resonance frequency and the intensity of the acoustic signals.

2. The method of claim 1, further comprising dividing the acoustic impedance of the formation by an acoustic wave velocity of the formation to obtain a formation density measurement.

3. The method of claim 2, further comprising:
repeating said positioning, measuring, and dividing to obtain the formation density measurement as a function of position along the borehole; and displaying the formation density measurement as a function of position along the borehole.

4. The method of claim 2, further comprising measuring the acoustic wave velocity of the formation with spaced-apart acoustic transducers.

5. The method of claim 2, further comprising:
repeating said positioning, measuring, and dividing to obtain the formation density measurement as a function of position around the borehole; and
displaying the formation density measurement as a two-dimensional image, the image being a function of position along and around the borehole.

6. The method of claim 1, wherein said measuring includes:
sensing an acoustic transducer surface pressure and an acoustic transducer surface displacement; and
calculating an acoustic impedance of the acoustic transducer as a ratio of the acoustic transducer surface pressure to the acoustic transducer surface displacement.

7. The method of claim 1, wherein said measuring includes determining the resonance frequency by identifying a maximum magnitude of an acoustic impedance of the acoustic transducer as a function of frequency.

8. The method of claim 1, wherein said measuring includes determining the resonance frequency of the fluid layer by identifying a frequency at which acoustic transducer surface pressure and acoustic transducer surface displacement are in phase.

9. The method of claim 1, further comprising performing a frequency sweep to determine the resonance frequency of the fluid layer.

10. The method of claim 1, further comprising determining the resonance frequency of the fluid layer by performing a spectral analysis of a response of the acoustic transducer to a broadband signal.

11. A system, comprising:
a sonic logging tool that passes along a borehole through a formation
wherein the sonic logging tool includes an acoustic transducer having a surface positioned substantially parallel to a wall of the borehole, thereby creating a fluid layer between the wall and the surface of the acoustic transducer, and
wherein the sonic logging tool measures a resonance frequency and an intensity of acoustic signals at the surface of the acoustic transducer caused by the acoustic signals propagating through the fluid layer; and
a processor coupled to the sonic logging tool which receives the resonance frequency and the intensity of the acoustic signals and determines an acoustic impedance of the formation based on the resonance frequency and the intensity of the acoustic signals.

12. The system of claim 11, wherein the processor further receives an acoustic wave velocity and determines a density of the formation by dividing the acoustic impedance of the formation by the acoustic wave velocity.

13. The system of claim 12, further comprising a display device which presents the density as a function of position along the borehole to a user.

14. The system of claim 12, further comprising a display device which presents a two-dimensional image of the density to a user, the two-dimensional image being a function of position along and around the borehole.

15. The system of claim 11, further comprising a non-transient information storage medium where the processor stores the density as a function of position along the borehole.

16. The system of claim 11, wherein the acoustic transducer is a piezoelectric transducer.

17. The system of claim 11, wherein the acoustic transducer comprises:
a speaker coil;
a plate arranged on an exterior of the transducer; and
a stress sensor arranged between the speaker coil and the plate.

18. The system of claim 11, wherein the acoustic transducer is part of a drill collar.

19. The system of claim 11, wherein the resonance frequency ranges from 10 kHz to 250 kHz.

20. The system of claim 11, wherein the sonic logging tool generates a broadband signal and the processor determines the resonant frequency of the fluid layer by performing a spectral analysis of a response of the acoustic transducer to the broadband signal.

21. The system of claim 11, wherein the acoustic signals are emitted and received in a wireline environment.

22. The system of claim 11, further comprising a phased array of acoustic transducers, including the acoustic transducer, that operate to reduce fringe effects.

* * * * *